Figure 2:
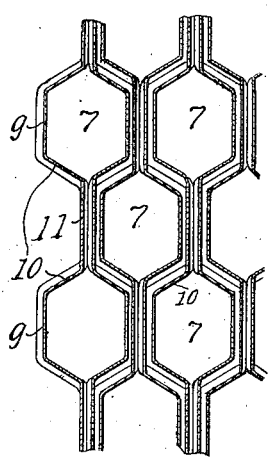

I. WHITE.
RADIATOR.
APPLICATION FILED JULY 25, 1914.

1,189,762.

Patented July 4, 1916.

Witnesses:
John E. Titus
Robert Dobberman

Inventor:
Isidor White
by Rector Hibben Davis & Macauley
His Atty's

UNITED STATES PATENT OFFICE.

ISIDOR WHITE, OF CHICAGO, ILLINOIS.

RADIATOR.

1,189,762.  Specification of Letters Patent.  Patented July 4, 1916.

Application filed July 25, 1914. Serial No. 852,972.

*To all whom it may concern:*

Be it known that I, ISIDOR WHITE, a citizen of the United States, residing at Chicago, in the county of Cook and State of Illinois, have invented certain new and useful Improvements in Radiators, of which the following is a specification.

My invention relates more particularly to radiators for automobiles.

The purpose of this type of device is to circulate the water used in cooling the engine of an automobile or the like in contact with conduits through which air is rapidly passing that the latter may receive the heat conducted to it from the water through the walls of the conduits and convey it away, thereby cooling the water which is returned to the engine again for cooling the latter. The water circulates constantly upwardly through the cooling chambers of the engine then by a suitable pipe to a point near the top of the radiator, thence downwardly through passages provided for it in the radiator and in contact with the walls of the air conduits therein and back to the engine.

The radiator commonly or universally employed in automobile construction takes the form of a metallic plate or block of honey comb structure, having innumerable horizontal air passages extending side by side through the plate or block from front to rear thereof to permit the air to flow freely therethrough with water channels extending in a generally vertical direction between and in contact with the walls of the air passages, and connected to common conduits at top and bottom for the supply of water to the channels and its exit therefrom. Such radiators are commonly placed at the front of the automobile of which they form a part, and extend transversely across the same to provide a rapid flow of air through the air channels. The effectiveness of such construction depends on the rapidity of flow of the air and water respectively and the rapidity of conduction of heat from the water to the air.

The object of my invention, therefore, is to produce a radiator in which the circulation of the air and water and the conduction of heat from the latter to the former are as rapid as possible. For this purpose my improved radiator is constructed with the greatest possible extent of conducting wall and cooling surface for the space occupied and affords the freest circulation of air and water attainable. The construction has a further advantage that it provides no horizontal ledges or pockets in the water channels upon or in which dirt, sediment, etc., can lodge and clog up said passages. The walls of the passages can be made of exceedingly thin material, thus providing for rapid connection between the air and water without unduly weakening the construction and by reason of the particular construction of the walls sufficient resilience is attained to avoid breakage due to shock and the like or to crystallization of the metal of which the walls are made. Furthermore, my improved form of radiator is strong and easily and cheaply constructed.

In the accompanying drawings and in the following description, I have set out in detail a preferred embodiment of my invention. It is to be understood, however, that the specific disclosure is for the purpose of exemplification only and that the invention is defined in the following claims in which I have endeavored to distinguish it from the prior art so far as known to me without, however, relinquishing or abandoning any portion or feature thereof.

Figure 1:
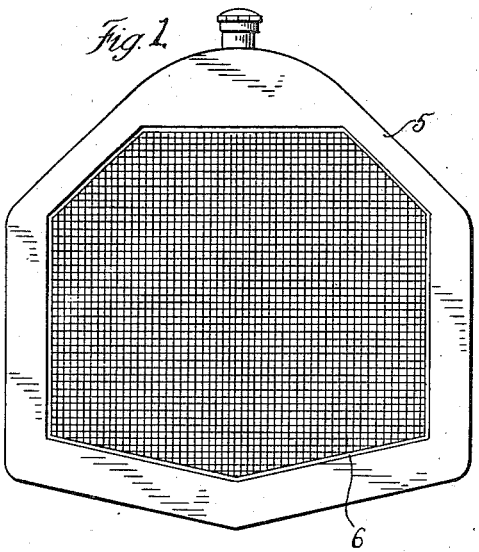
Figure 3:
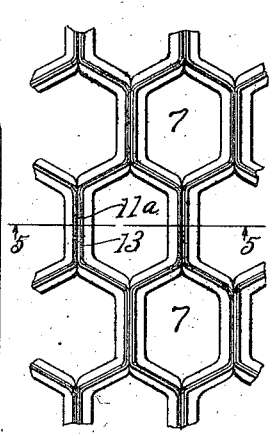
Figure 4:
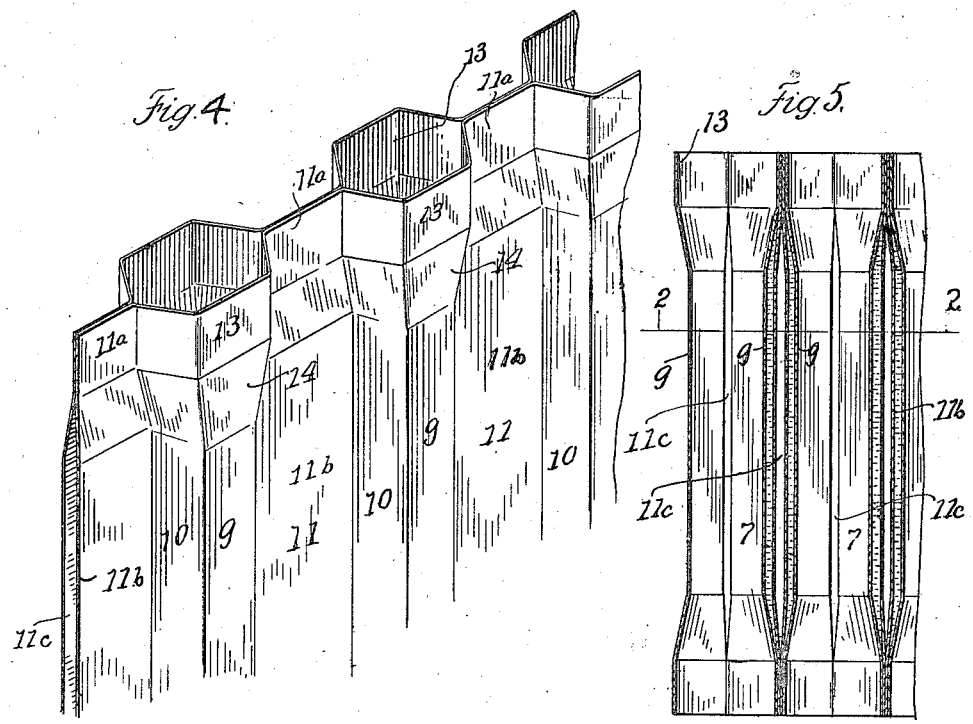
Figure 5:
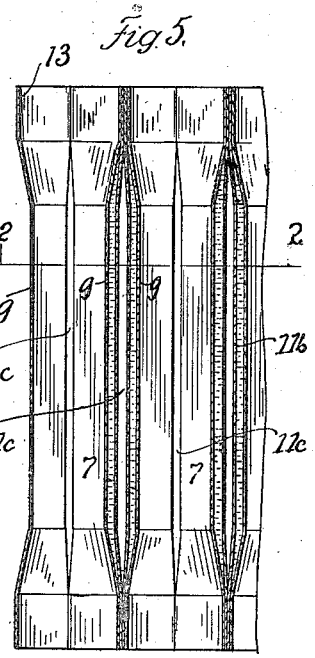

Referring now to the accompanying drawing, Figure 1 is an elevation of the front of a radiator of an ordinary design to which my invention is or may be applied, though by reason of the scale of the drawing the novel features thereof do not appear; Fig. 2 is a section on an enlarged scale parallel to the plane of Fig. 1 on the line 2—2 of Fig. 5 showing the arrangement of the cooling walls and surfaces; Fig. 3 is an enlarged front elevation of a detail on the plane of Fig. 1, showing the connected edges of the strips of the honey-comb; Fig. 4 is an enlarged perspective of one of the elements making up the honey-comb, and Fig. 5 is a horizontal section on the line 5—5 of Fig. 3.

The radiator follows the ordinary type to the extent that it comprises a framework 5 surrounding a honey-comb section 6 in which latter the innumerable air and water passages are formed. The frame 5 as in similar constructions of the prior art provides passages for introducing water to the upper ends of the water passages and conveying it away from the lower end of the water passages, and said frame may be connected to the engine above and below as above stated. It may be stated generally that the air passages 7 are preferably hexagonal in cross-section but with rounded corners and arranged in horizontal rows, the members of successive rows, however, being staggered as will be best understood from an inspection of Fig. 2. The water channels extend from top to bottom of the radiator and form a zig-zag or undulating path for the water between the air conduits.

The construction is made in the following manner from a strip or strips of thin copper or other metal of a width substantially equal to the thickness of the radiator body from front to rear, that is to say, equal to the length of the air passages therethrough. The strip is passed through a corrugating machine in which it is crimped transversely to form plane sections 9 and 11 substantially parallel to the direction of extension of the strip, but offset laterally with respect to each other and connected by inclined walls 10 which are at an angle of approximately 120 degrees to the sections 9, 11. The corners between the adjacent sections are rounded as shown to prevent straining of the metal and avoid trapping any sediment contained in the water. In order to make up an element of the honey-comb such as shown in Fig. 4, two sections of metal strip corrugated as above described, are placed together, or a single strip folded upon itself to bring the walls 9, 9, of the respective strips in registry with each other to form the transverse air channels 7. It will be noted by reference more particularly to Figs. 4 and 5 that the walls 11 are offset at their ends 11$^a$ toward each other so that the intermediate portions 11$^b$ are spaced apart thus forming air passages 11$^c$ connecting the air channels in the element. A number of such elements each composed of the two strips or a folded strip are arranged vertically side by side extending the full width of the radiator the air conduits in alternate elements being arranged horizontally in the same plane with each other and the air conduits in intermediate elements being likewise arranged horizontally in the same plane with each other but staggered with relation to the first said conduits and interlocked therewith, as clearly seen in Fig. 2. The elements, however, are spaced apart sufficiently to permit the circulation of water downwardly between them. In order to properly space the several elements apart the portions of the strips comprising the same which are to form the vertical or side walls of the air conduits are bent or offset outward at their end portions 13 (see Fig. 4) forming shoulders 14 intermediate said end portions and the intermediate portions of the walls 9. When the elements are assembled as shown in Fig. 2 said end portions abut against the intermediate double wall portions 11$^a$ of adjacent elements so that the intermediate portions form between them and walls 11$^b$ a channel for the flow of water between the adjacent elements. The edges of the strips and their relative arrangement are best seen in Fig. 3, the end portions 13 of alternate elements being shown on opposite sides of the double walls of the intermediate elements forming a quadruple thickness at these portions of the structure. The width of the water channel is of course determined by the extent of offset of these end portions of the conduit walls. After the elements are assembled with their edges in contact, as seen more particularly in Fig. 3, the honey-comb is dipped in solder to the depth of the offset edge portions of the strips, on each face of said honey-comb whereby the strips are firmly secured together in the position shown, and the air and water passages are securely sealed along said edges.

It will now be apparent that my improved form of radiator is easy of manufacture, provides a maximum extent of cooling wall of thin metal through which heat is directly conducted from the water to the air no fins being employed. The construction is such as to afford the freest possible passage for the air from the front to the rear of the radiator and also between the several air channels in each element and unobstructed water passages of great length and of equal width throughout from the top to the bottom of the core, there being no flat ledges or shoulders to accumulate dirt or the like or to hinder the ready passage of matter contained in the water. The extent of the flat metal in contact and soldered together assures great rigidity while the rounding of the corners prevents breakage under expansion and contraction and crystallization.

I claim:

A radiator of the class described, comprising a series of elements each composed of strips of thin metal struck up to form sections 9 and 11 substantially parallel to the direction of extension of the strip, but offset laterally with respect to each other and connected by inclined walls 10, the strips of each element being arranged with the sections 9 opposite each other in pairs to form air channels 7, and the sections 11 also opposite each other, the elements so formed being vertically arranged side by side with the corresponding air channels of alternate elements in the same horizontal plane, and the corresponding air channels of intermediate elements in the same horizontal plane with each other, walls or sections 9 of each air channel being offset outwardly at their ends to space said walls or sections from the walls 11 of adjacent elements, and the walls 11 of each element being offset inwardly at their ends to space them apart and form passages connecting the air channels.

ISIDOR WHITE.

Witnesses:
 JOHN B. MACAULEY,
 ROBERT DOBBERMAN.